(12) United States Patent
Kim et al.

(10) Patent No.: US 11,781,920 B2
(45) Date of Patent: Oct. 10, 2023

(54) TEMPERATURE SENSOR CIRCUIT FOR RELATIVE THERMAL SENSING

(71) Applicant: Texas Instruments Incorporated, Dallas, TX (US)

(72) Inventors: Eung Jung Kim, Allen, TX (US); Abidur Rahman, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/706,113

(22) Filed: Mar. 28, 2022

(65) Prior Publication Data
US 2022/0214226 A1 Jul. 7, 2022

Related U.S. Application Data

(62) Division of application No. 16/395,860, filed on Apr. 26, 2019, now Pat. No. 11,320,320.

(60) Provisional application No. 62/703,245, filed on Jul. 25, 2018.

(51) Int. Cl.
*G01K 7/21* (2006.01)
*G01K 7/02* (2021.01)
*G01K 7/16* (2006.01)

(52) U.S. Cl.
CPC ............... *G01K 7/021* (2013.01); *G01K 7/16* (2013.01)

(58) Field of Classification Search
CPC .................................. G01K 7/021; G01K 7/16
USPC ......... 374/170, 183, 178, 512, 513; 702/132
See application file for complete search history.

(56) References Cited

U.S. PATENT DOCUMENTS

| | | | | |
|---|---|---|---|---|
| 5,408,235 A | * | 4/1995 | Doyle | H03H 17/0251 341/120 |
| 5,519,354 A | * | 5/1996 | Audy | G05F 3/265 327/512 |
| 6,060,874 A | * | 5/2000 | Doorenbos | G05F 3/30 323/907 |

(Continued)

FOREIGN PATENT DOCUMENTS

| CA | 2064086 A1 | * | 1/1991 | |
|---|---|---|---|---|
| CN | 105094196 B | * | 9/2017 | G05F 3/16 |

(Continued)

OTHER PUBLICATIONS

Data Sheet, entitled TPS2HB16-Q1 40-V, 16-m(ohm) Dual-Channel Smart Hight-Side Switch, Texas Instruments Incorporated, Feb. 2018, 9 pgs.

*Primary Examiner* — Gail Kaplan Verbitsky
(74) *Attorney, Agent, or Firm* — Ray A. King; Frank D. Cimino

(57) ABSTRACT

An example device includes a first temperature sensor configured to provide a first current signal indicative of a temperature of a first circuit based on a voltage of a first temperature sensing element. The first circuit includes a power switch device and the first temperature sensing element. A second temperature sensor is configured to provide a second current signal indicative of temperature of a second circuit based on a voltage of a second temperature sensing element. The second circuit includes the second temperature sensing element. A trim circuit is configured to trim current in at least one of the first temperature sensor or the second temperature sensor to compensate for mismatch between temperature coefficients of the first and second temperature sensing elements.

13 Claims, 6 Drawing Sheets

(56) References Cited

U.S. PATENT DOCUMENTS

| | | | | |
|---|---|---|---|---|
| 6,137,341 | A * | 10/2000 | Friedman | G05F 3/265 |
| | | | | 327/512 |
| 6,949,968 | B1 * | 9/2005 | Mulligan | H03F 1/30 |
| | | | | 327/512 |
| 7,565,258 | B2 * | 7/2009 | Duarte | G01K 7/01 |
| | | | | 702/132 |
| 9,261,415 | B1 * | 2/2016 | Zhang | G05F 3/16 |
| 2006/0056485 | A1 * | 3/2006 | Hartley | G01K 7/01 |
| | | | | 374/170 |
| 2007/0216468 | A1 * | 9/2007 | Duarte | G01K 7/01 |
| | | | | 702/132 |
| 2014/0152390 | A1 * | 6/2014 | McMorrow | H03F 1/0277 |
| | | | | 330/296 |

FOREIGN PATENT DOCUMENTS

| | | | | | |
|---|---|---|---|---|---|
| GB | 2452324 | A | * | 3/2009 | G05F 3/30 |
| JP | 2011017641 | A | * | 1/2011 | |
| WO | WO9011645 | A1 | * | 10/1990 | |

\* cited by examiner

TEMPERATURE SENSOR CIRCUIT FOR RELATIVE THERMAL SENSING

CROSS-REFERENCE TO RELATED APPLICATION

This division application claims the benefit of priority to U.S. patent application Ser. No. 16/395,860, filed Apr. 26, 2019, which application claims the benefit of priority from U.S. Provisional Application No. 62/703,245, filed Jul. 25, 2018, both of which are incorporated herein by reference in their entirety.

TECHNICAL FIELD

This disclosure relates to temperature sensor circuitry for relative thermal sensing.

BACKGROUND

Switch devices, such as power metal oxide field effect transistors (MOSFETs), are used for a wide range of applications. In automotive and other applications, the switch devices are subjected to a wide range of voltage supplies and even a wider range of transient electrical disturbances, such as may occur when disconnecting inductive loads, sudden power cutoffs, switch bouncing or the like.

As one example, a safe operating area (SOA) limit of a power switch device (e.g., MOSFET) tends to vary significantly depending on its junction temperature. During circumstances of high in-rush current, limiting peak power in power switch device cannot provide adequate protection for many load driving applications because the load cannot be energized high enough if the switch is prematurely turned off during the high in-rush current condition.

SUMMARY

This disclosure relates to temperature sensor circuitry for relative thermal sensing, such as may be used for shutdown of a power switch.

In one example, a device includes a first temperature sensor configured to provide a first current signal indicative of a temperature of a first circuit based on a voltage of a first temperature sensing element. The first circuit includes a power switch device and the first temperature sensing element. A second temperature sensor is configured to provide a second current signal indicative of temperature of a second circuit based on a voltage of a second temperature sensing element. The second circuit includes the second temperature sensing element. A trim circuit is configured to trim current in at least one of the first temperature sensor or the second temperature sensor to compensate for mismatch between temperature coefficients of the first and second temperature sensing elements.

In another example, a circuit includes a level shifter including an input adapted to be coupled to a diode and including a level shifter output. A voltage-to-current converter includes an input coupled to the level shifter output and a sensor current output. An offset trim circuit includes an offset current output. A proportional to absolute temperature (PTAT) current generator includes a first PTAT input coupled to the sensor current output and a second PTAT input coupled to the offset current output. The PTAT current generator also includes a PTAT output. A gain trim circuit includes an input coupled to the PTAT output and including a sensor output.

In yet another example, a system includes a first circuit and a second circuit. The first circuit includes a power switch device and a first sensing element configured to provide a first voltage that varies based on a temperature of the power switch device. The second circuit includes a second sensing element configured to provide a second voltage that varies based on a temperature of a substrate of the second circuit. A first temperature sensor is configured to convert the first voltage to a first current signal indicative of a temperature of the first circuit. A second temperature sensor is configured to convert the second voltage to a second current signal indicative of a temperature of the second circuit. A trim circuit is configured to apply at least one of an offset trim or gain trim to adjust current in at least one of the first temperature sensor or the second temperature sensor to compensate for mismatch between temperature coefficients of the first and second sensing elements.

DETAILED DESCRIPTION

Figure 1:
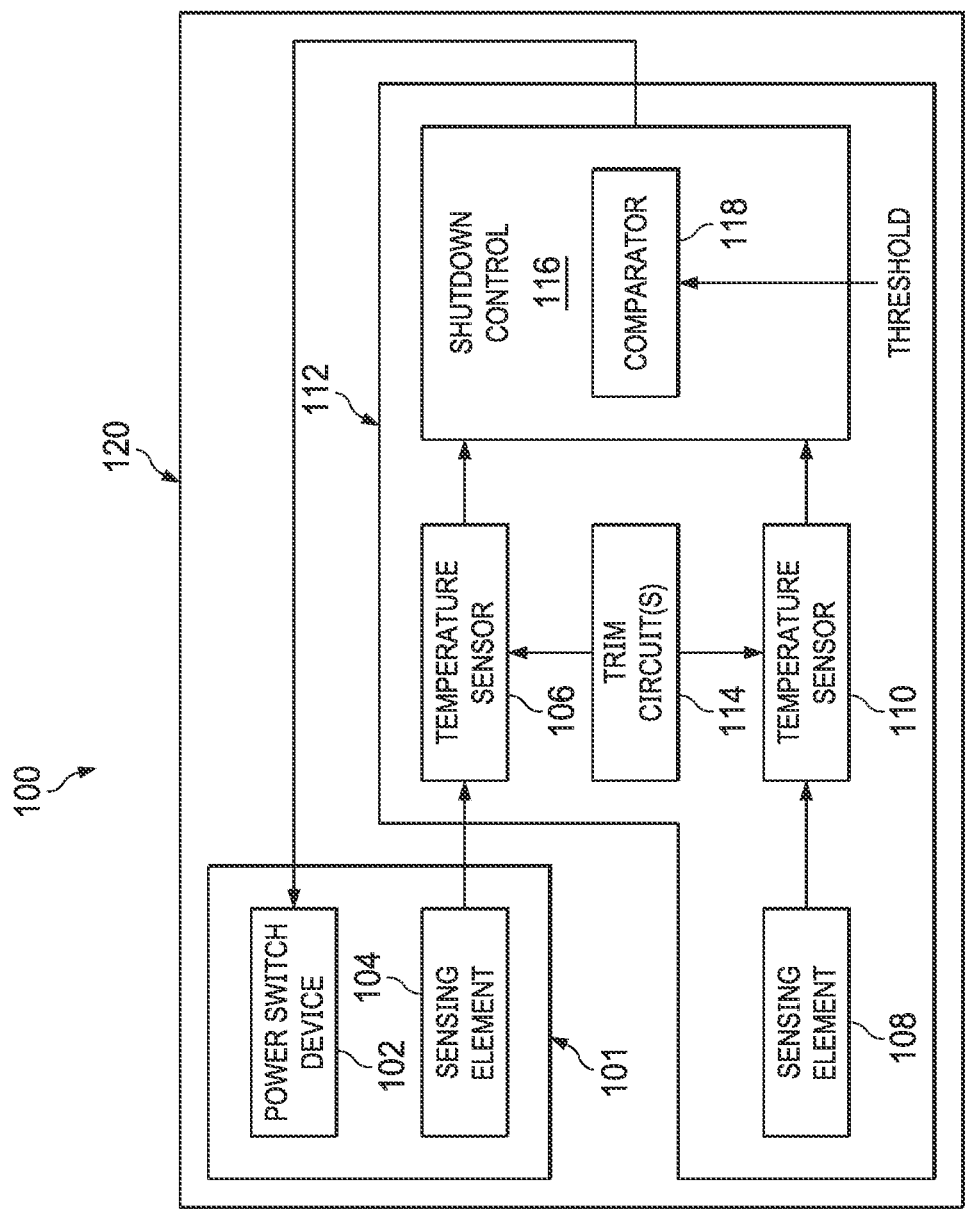
FIG. 1 depicts an example of a system to perform temperature sensing for controlling shutdown of a power switch device.

This disclosure relates to thermal sensing (e.g., monitoring) of associated circuitry, such as may include power switch devices (e.g., metal oxide semiconductor field effect transistors (MOSFETs), bipolar junction transistors (BJTs), insulated gate bipolar transistors (IGBTs)).

By way of example, the thermal sensing of the associated circuitry may be used to control shutdown of one or more power switch devices implemented on such associated circuitry. The thermal sensing and shutdown can be utilized to help ensure that power switch devices operate within defined safe operating area (SOA) of the devices, which are usually described in the datasheets for such devices. The SOA for a given device may change depending on its junction temperature. In various applications, limiting the peak power in the power switch device (e.g., metal oxide semiconductor field effect transistor (MOSFET)) may not provide an adequate cost-effective solution for driving certain types of loads. For example, if the load condition changes over time, device SOA limit may be over-designed if max peak power is only considered. On the other hand, if the switch device is turned off prematurely by utilizing medium or low peak power to determine device SOA during high in-rush current conditions, the load may not be energized sufficiently. Accordingly, this disclosure provides an approach (e.g., circuitry, devices and systems) to sense temperature of the power switch device that can be utilized to limit energy accumulation during high in-rush current conditions. Advantageously, the approach disclosed herein can be implemented as a low-cost solution with a reduced on-die area compared to many existing designs.

As an example, a device includes a first temperature sensor configured to provide a first current signal indicative of a temperature of a first circuit based on a voltage signal from a sensing element (e.g., a thermal diode) that is part of the first circuit. For example, the sensing element is configured to provide the voltage signal to represent a temperature of a power switch device (e.g., a power MOSFET). The first circuit may be implemented as an integrated circuit (IC) die (e.g., a FET die) that includes a power switch device and the sensing element fabricated on a common semiconductor substrate of the IC die. In this way the voltage from the temperature sensing element represents the temperature of the switch device. In an example, the first temperature sensor can reside in a separate circuit, such as another IC die (e.g., a controller die) that includes temperature sensing and other circuitry configured to perform related control functions, such as including controlling thermal shutdown of the power switch device.

As a further example, the controller die includes a second temperature sensor that is configured to provide another current signal indicative of a temperature of a second circuit based on another voltage signal. For example, a second sensing element (e.g., thermal diode) is configured to sense the temperature of the second circuit, which corresponds to an ambient temperature of the second circuit (e.g., the controller die) outside of the switch device (e.g., power FET). Trim circuitry is configured to trim the current in one or more of the temperature sensors to compensate for mismatch between temperature coefficients of the first and second temperature sensing element (e.g., diodes) such as may result from implementing thermal diodes on different IC dies. As an example, the trim circuitry can be configured to apply gain trim and/or offset trim to each of the first and second temperature sensors.

The device can also include shutdown circuitry that includes a comparator configured to compare the first and second current signals and to trigger a shutdown of the power switch device based on a relative temperature (e.g., as represented by a difference between the first and second current signals) exceeding a threshold. By implementing the trim circuitry to compensate for temperature coefficient mismatch of temperature sensing elements, the shutdown control can apply a substantially constant threshold across expected operating temperatures. Additionally, by implementing the temperature sensors as current mode sensors (e.g., instead of voltage load sensors) a reduced number of circuit components may be utilized, such as by implementing current mirror structures to evaluate signals, which results in a reduced fabrication cost. The current mode operation also enables efficiently extending the devices and circuits disclosed herein to sensing temperature and thermal shutdown for multichannel devices that include multiple power switch devices (e.g., FET IC dies). Because the current mode operation can reduce the number of components, resulting in fewer components connected in series between the supply and ground, the circuits and devices here may exhibit a wider operating range under low power supply conditions.

As used herein, a device or component that is "configured to" perform a task or function may be configured (e.g., programmed and/or hardwired) at a time of manufacturing by a manufacturer to perform the task or function and/or may be configurable (or re-configurable) by a user after manufacturing to perform the function and/or other additional or alternative functions. The configuring may be through firmware and/or software programming of the device, through a construction and/or layout of one or more physical hardware components and/or interconnections of the device, or a combination thereof.

FIG. 1 depicts an example of a temperature sensing device 100. The temperature sensing device 100 is configured to detect a relative temperature between different circuits. For example, a first circuit 101 includes a power switch device 102 and a temperature sensing element 104. The circuit 101 containing the power switch device 102 and the temperature sensing element 104 may be implemented as an IC die. For example, the temperature sensing element 104 is a thermal diode configured to provide a diode voltage that varies based on a temperature of a substrate (e.g., at a PN junction of the diode) in which the diode is implemented. In other examples, the temperature sensing element 104 may comprise different circuitry, such as a scaled current circuit or a temperature dependent resistor circuit. For sake of consistency, in the example embodiments disclosed herein, the temperature sensing elements are shown and described as thermal diodes that are forward biased to generate respective diode voltages that vary based on temperature. Thus, the sensing element 104 provides the voltage to an input of a temperature sensor 106.

Another temperature sensing element (e.g., thermal diode) 108 is part of another circuit (e.g., another IC die) 112. The sensing element 108 is configured to provide a voltage to a second temperature sensor 110 indicative of an ambient temperature of the device 100 (e.g., the temperature at a PN junction of the diode implemented in the circuit 112). As an example, the sensing element 108 and temperature sensors 106 and 110 are implemented in the same circuit 112, which may be a second IC die that is separate from the IC die of circuit 101.

As an example, each of the temperature sensors 106 and 110 is configured to provide a current signal indicative of the temperature of the respective circuit 101 and 112 based on the diode voltage. Each temperature sensor 106 and 110 can be configured using current mode circuitry such that the trim circuitry adjust the gain of the current signal propagating for the sensor and/or introduces a current offset into the current signal to compensate for the temperature coefficient mismatch. Thus, each temperature sensor 106 and 110 provides an output current signal indicative of the sensed temperature. As a result, a difference between the current values provides an indication of relative temperature between the circuit 101 and the circuit 112 in which the respective sensing elements 104 and 108 are implemented.

Because each of the circuits 101 and 112, including temperature sensing elements 104 and 108, may be fabricated using different processes and process technologies, temperature coefficient mismatches may arise with respect to the sensing elements (e.g., diodes) 104 and 108. To compensate for the mismatches in the temperature coefficients of sensing elements 104 and 108, the device 100 also includes trim circuitry 114. The trim circuitry 114 is configured to trim current in at least one or both of the temperature sensors 106 and 110 to compensate for mismatches between the temperature coefficients of the sensing elements 104 and 108. As an example, the trim circuitry 114 includes a first trim circuit configured to apply gain and/or offset to the temperature sensor 106. Additionally or alternatively, the trim circuitry 114 includes a second trim circuit configured to apply gain and/or offset to the temperature sensor 110.

The device 100 also includes a shutdown control circuit 116 configured to control shutdown of the power switch device 102 based on a difference (e.g., representing relative temperature) between the current signals from sensors 106 and 110 exceeding a threshold. Because the trim circuitry 114 compensates for mismatches and temperature coefficients between the sensing elements (e.g., diodes) 104 and 108, a consistent threshold may be provided across a range of ambient temperatures and affords accurate temperature sensing of the power switch device 102 during fast high in-rush current conditions. As an example, the circuit 112 can correspond to an IC die implementing a control system, such as to control the power switch device 102 (e.g., via control signal) in response to an input signal from a relay, switch or the like.

The example of FIG. 1 demonstrates a single power switch device 102 in an IC die. In other examples more than one switch device 102 may be implemented in the device 100 along with a respective temperature sensor for receiving the thermal voltage signal and providing respective current signals indicative of the sensed temperature. In this example, by implementing each of the temperature sensors 106 and 110 and any additional temperature sensors in a current mode technology, the device 100 may be fabricated in an area efficient manner to provide a multichannel switching control system. For the example of an automotive application, each such power switch device may be connected to control a load such as a light, fan, actuator or the like.

By way of example, the shutdown control 116 includes a comparator 118 that determines a difference between the current signals from temperature sensors 106 and 110 relative to a threshold to ascertain whether the temperature of the power switch device 102 exceeds the temperature of the circuit 112 by an amount greater than the threshold. The shutdown control 116 thus is configured to trigger thermal shutdown of the power switch device 102 based on the comparison. In an example, the device 100 can be implemented in common IC packaging, demonstrated schematically at 120. As a further example, each power switch circuit 101 and control circuit 112 is implemented as an IC die are packaged (e.g., as a multi-die module) within an encapsulant, such as an epoxy, epoxy blend, silicon, polyimide or another potting or encapsulation material.

Figure 2:
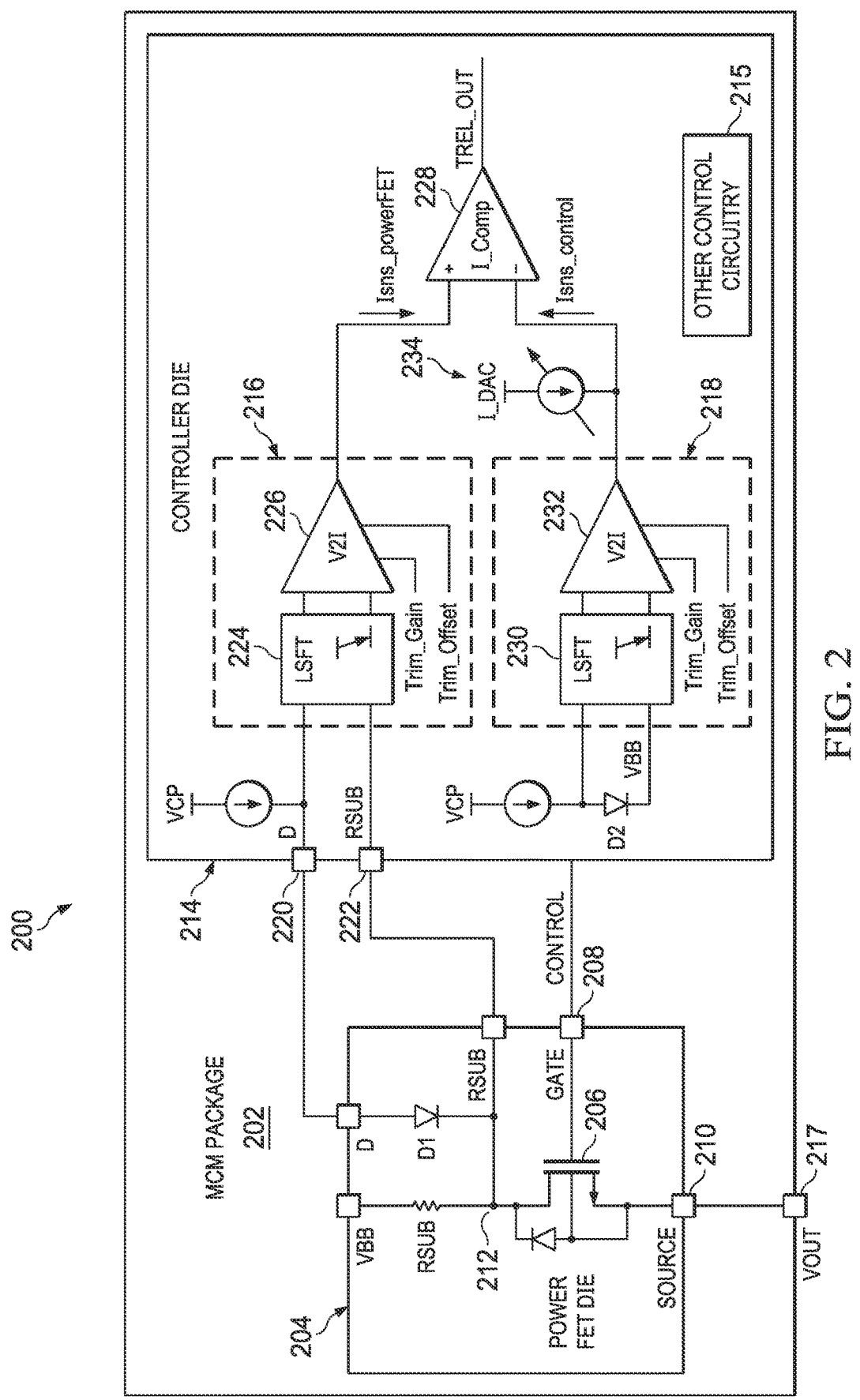
FIG. 2 depicts an example of a device to perform temperature sensing implemented in a multi-die module package.

FIG. 2 depicts an example of a temperature sensing system 200 in which the circuitry is implemented in a multi-die module package device 202. In this example, the temperature sensing system 200 includes a thermal diode D1 (e.g., corresponding to temperature sensing element 104) implemented on a first die 204. The die (e.g., a power FET die) 204 also includes a power switch device, demonstrated as a MOSFET (also referred to herein as a FET) 206 (e.g., corresponding to the power switch device 102). In this example, the FET 206 includes a gate terminal 208, a source terminal 210 and a drain terminal 212. The drain terminal 212 is coupled to a battery terminal through a substrate resistance demonstrated at RSUB. A battery (or other power supply—not shown), which supplies a supply voltage (VBB), may be implemented internal or external to the package 202 to supply electrical power to the power FET die 204 and/or a controller IC die 214. Control circuitry 215 in the IC die 214 may provide a control signal to the gate 208 of the FET 206 to turn on the FET to supply electrical power to a load (not shown) coupled to an output voltage terminal 217 of the device 202, which is coupled to the source 210.

The term "couple" is used throughout the specification. The term may cover connections, communications, or signal paths that enable a functional relationship consistent with the description of this disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

In this example, the controller IC die 214 includes a first temperature sensor 216 and a second temperature sensor 218 (e.g., corresponding to temperature sensors 106 and 110). The temperature sensor 216 is connected to the diode D1 to receive the diode voltage that represents the temperature of the IC die 204. For example, the die 214 includes a charge pump configured to a voltage to forward bias the diode D1 to provide a diode voltage across that varies based on temperature of the PN junction of D1. In an example of FIG. 2, the temperature sensor 216 includes inputs 220 and 222 coupled to the anode and cathode of the diode D1, such that the diode voltage is provided in a differential voltage to respective inputs of the temperature sensor 216.

The temperature sensor 216 is configured to convert the sensed diode voltage to a corresponding current signal (ISNS_Power_FET) that represents the sensed temperature of the FET 206. As an example, the temperature sensor 216 includes a level shifter 224 configured to shift the level of the diode voltage to a desired voltage level. For example the level shifter 224 can shift down the diode voltage to a level that is below the battery voltage VBB. The level shifter 224 thus provides a level shifted diode voltage to inputs of a voltage-to-current (V2I) converter 226. The converter 226 is configured to convert the level shifted voltage to the corresponding current ISNS_Power_FET. The converter 226 is further configured to compensate for a temperature coefficient mismatch according to a trim gain and/or trim offset applied to the temperature sensor 216. The trim gain and trim offset can be applied by associated trim circuitry (not shown—but see, e.g., FIG. 3). The current from the temperature sensor 216, which has been adjusted based on the trim gain and/or trim offset, is applied to a respective input of a current comparator 228. The second temperature sensor 218 applies another current signal demonstrated at ISNS_Control to the other input of the comparator 228.

For example, the second temperature sensor 218 is configured to provide the current signal ISNS_Control to the comparator 228 based on the voltage across another temperature sensing element, demonstrated as diode 222 (e.g., corresponding to temperature sensing element 108). For example, the diode 222 is implemented on the IC die 214 as part of the control circuitry. Similar to the temperature sensor 216, a charge pump is configured to apply a voltage to forward bias the diode to provide a voltage across the diode D2, which varies based on the temperature of the IC die 214. The diode voltage from D2 is applied to the input of the temperature sensor 218. For example, a differential voltage across the diode D2 is provided as the diode voltage to an input of a level shifter 230. The level shifter 230 is configured to shift the diode voltage (e.g., down) to a desired level below the battery voltage and produces the level-shifted differential voltage to respective inputs of a voltage-to-current converter 232. The converter 232 is adjusted in response to a trim gain and/or trim offset to provide the corresponding current signal ISNS_Control representing an ambient temperature of the IC die 214 (and the system 200 more generally). For example, the trim gain and/or trim offset are supplied by trim circuitry, as disclosed herein (see, e.g., FIG. 3).

For example, a threshold circuit 234 is configured to apply a threshold (e.g., a current signal) to the current provided by the sensor 218. The threshold may be fixed or be programmable. While in the example of FIG. 2, the threshold circuitry 234 applies the offset current to the current provided by sensor 218, in an alternative example, the current could be applied to the current provided by the temperature sensor 216. By injecting current to one of the sensor signals in this way, the comparison of the current signals by comparator 228 results in a relative temperature output signal (TREL_OUT) that can be utilized to control thermal shutdown of the power switch device 206. For example, if the temperature of the IC die 204, as indicated by the current signal ISNS_Power_FET from sensor 216, exceeds the temperature sensed by diode D2 for the IC die 214 by an amount greater than the threshold, as indicated by the ISNS_Control signal, the comparator 228 provides a corresponding output (e.g., applied to the gate 208) to trigger shutdown of the power switch device 206. If the temperature of the IC die 204 does not exceed the temperature of the ICI die 214 by the threshold, the comparator 228 provides a low output, such that the power switch device 206 can remain operating.

By implementing trim gain and offset with respect to the voltage to converters 226 and 232, a finer degree of control and mismatch compensation may be implemented in the device 202, which results in a more accurate relative temperature determination by the comparator 228. This further results in more accurate thermal shutdown control for the power FET device 206 across a wide range of ambient temperatures.

Figure 3:
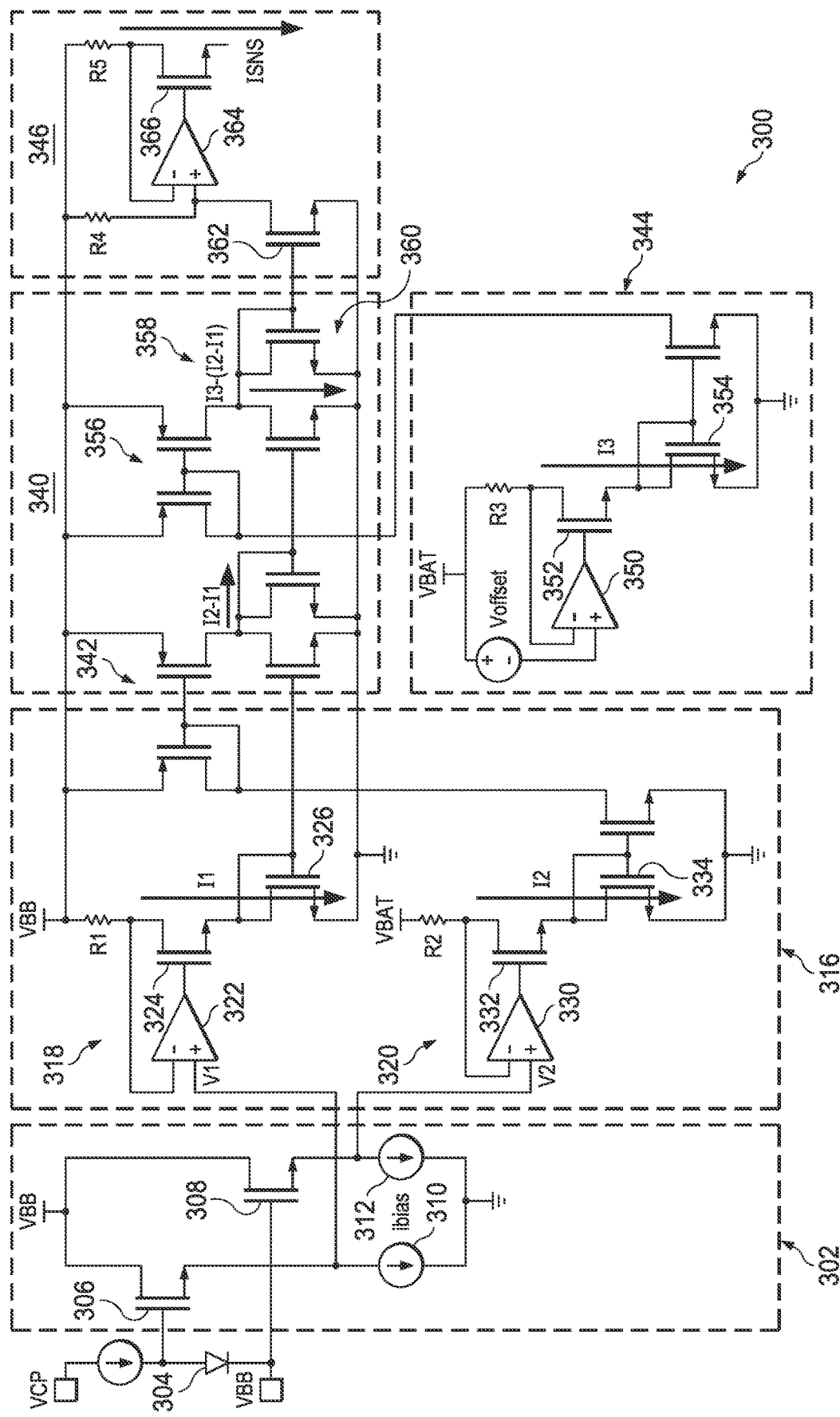
FIG. 3 depicts an example of a temperature sensor circuit.

FIG. 3 depicts an example of a sensor circuit 300, which may be utilized to implement respective sensors 106, 110 of FIG. 1 or respective sensors 216, 218 of FIG. 2. The sensor circuit 300 includes a level shifter 302 that includes one or more inputs adapted to be coupled to a temperature sensing element. For example, the temperature sensing element is a thermal diode 304 configured to provide a diode voltage based on temperature of a circuit on which the diode 304 is implemented. The diode 304 can reside on the same IC die as a power switch device (e.g., IC 101 or 204) or may correspond to a diode implemented on another IC die (e.g., die 112 or 214) such as corresponding to the control circuitry. Thus, in one example, each of the temperature sensors herein (FIGS. 1, 2 and 11) may be implemented according to the configuration of the sensor circuit 300 disclosed with respect to FIG. 3.

In this way, the diode voltage may represent the temperature of the FET also implemented on the same circuit with the diode. A charge pump can be coupled to the anode to provide an excitation current to forward bias the diode for supplying the diode voltage. A cathode of the diode 304 can be connected to a battery voltage VBB, such as directly or through a substrate resistance (e.g., RSUB of FIG. 2).

As an example, the level shifter 302 includes FET devices 306 and 308, each having its gate coupled as inputs to receive the diode voltage as a differential voltage across the diode 304. The FET device 306 is connected in series with a current source 310 between the battery voltage VBB and electrical ground. The transistor device 308 is also connected in series with another current source 312 between VBB and electrical ground. The level shifter 302 includes outputs coupled to respective inputs of a voltage-to-current converter circuitry 316. The level shifter 302 thus is configured to provide level shifted voltages V1 and V2 to respective inputs of the voltage-to-current converter 316. For example, the level shifter 302 can shift the diode voltage to a level that is below the battery voltage VBB. The example of circuit 300 of FIG. 3 demonstrates the diode voltage and the level-shifted output voltage being differential voltages, such as for a vertical FET structure (e.g., where the FET structures are stacked vertically). In other examples, the diode voltage may be a single input, such as in a non-vertical (e.g., horizontal) FET structure. In either case, the diode voltage varies according to a temperature differential across the PN junction of the diode 304.

The voltage-to-converter circuitry 316 includes a first converter 318 configured to convert the voltage V1 into a corresponding current I1 and a second converter 320 configured to convert the voltage V2 into a corresponding current I2. The currents I1 and I2 represent a differential current indicative of the temperature sensed by the diode 304.

By way of example, the voltage V1 is provided to a non-inverting input of amplifier 322 and an inverting input of amplifier 322 is coupled to the battery voltage VBB through a resistor R1. The output of amplifier 322 is connected to a gate of a FET 324, having its source connected to a diode connected FET 326 that is between the FET 324 and electrical ground. The first converter 318 thus provides the current I1, which may be represented as follows:

$$I1=(VBB-V1)/R1.$$

The second converter 320 is configured to convert the voltage V2 to a corresponding current I2. For example, the voltage V2 is connected to a non-inverting input of an amplifier 330. An inverting input of an amplifier 330 is connected to VBB through a resistor R2. The output of amplifier 330 is connected to the gate of an FET 332, which is coupled in series with a diode connected FET 334. By this configuration, the current I2 can expressed as follows:

$$I2=(VBB-V2)/R2.$$

A proportional to absolute temperature (PTAT) current generator circuit 340 is coupled with the outputs of the voltage-to-current converter circuitry 316. For example, the currents I1 and I2 are provided as input signals to the PTAT current generator 340 through respective FETs configured as current mirrors 342 to generate a corresponding difference current demonstrated at (I2–I1).

The circuit 300 also includes trim circuitry that includes an offset trim circuit 344 and a gain trim circuit 346. The offset trim circuit 344 is configured to generate and provide an offset current to the PTAT current generator circuit 340 demonstrated as I3. As an example, the offset trim circuit 344 is configured to provide the offset current I3 based on an offset voltage VOFFSET (e.g., a DC voltage). The offset voltage may be set by connecting a resistance (e.g., trim resisters) or by setting input value to a digital-to-analog converter (DAC) to set the offset voltage. The offset trim circuit 344 is configured to convert the offset voltage to the current I3, which is applied to the PTAT circuit 340 to adjust the level of the difference current (I2–I1). Because the differential current corresponds to the diode voltage (e.g., representing temperature), the offset current thus adjusts the temperature according to the applied offset.

As an example, the offset trim circuit 344 is configured as a voltage-to-current converter configured to convert the offset voltage to the offset current I3. For example, the offset voltage is connected between VBB and a non-inverting input of an amplifier 350. The inverting input of amplifier 350 is connected to VBB through a resister R3. An output of the amplifier is connected to the gate of an FET 352, which is connected in series with a resister R3 and a diode connected transistor 354 between VBB and electrical ground. As a result, the current I3 can be expressed as follows:

$$I3=(VBB-\text{VOFFSET})/R3.$$

The offset current I3 is provided as an offset input to the PTAT current generator circuit 340 through a current mirror network 356. In an example, the current mirror 342 or 356 may be implemented within PTAT generator circuit 340, in the voltage-to-current converter circuit 316 or current mirror circuitry may be distributed between the converter circuit 316 and the PTAT current generator circuit 340. The PTAT current generator circuit 340 includes additional current combining circuitry 358 (e.g., another current mirror network) configured to apply the offset current I3 to the difference current (I2−I1) to provide an offset-corrected current (I3−(I2−I1)).

Another current mirror 360 is configured to provide the offset-corrected current (I3−(I2−I1)) to an input of the gain trim circuit 346. The gain trim circuit 346 is configured to apply a gain to the offset corrected current (I3−(I2−I1)) to produce a current sensor signal ISNS representing the temperature detected by temperature sensing element, namely diode 304. For example, the sensor signal ISNS may correspond to ISNS_Power_FET from sensor 216 or ISNS_Control from sensor 218.

By way of example, the gain trim circuitry 346 includes a FET 362 having its gate connected through an output current mirror 360 to receive the offset corrected current. The FET 362 is connected in series with a resister R4 between the battery voltage VBB and electrical ground. The node between R4 and FET 362 is connected to the non-inverting input of an amplifier 364. The inverting input of amplifier 364 is connected to VBB through a resister R5. The amplifier thus is configured to amplify the current offset corrected current signal based on the gain established by a ratio of the resistors R4 and R5. The output of the amplifier 364 is connected to the gate of an output FET 366 which in turn provides the sensor current signal ISNS based on the offset corrected current and to gain supply by the relationship between resistors R4 and R5. As an example, the output sensor current ISNS can be equal to the following:

$$R4/R5*(I3-(I2-I1)).$$

Figure 4:
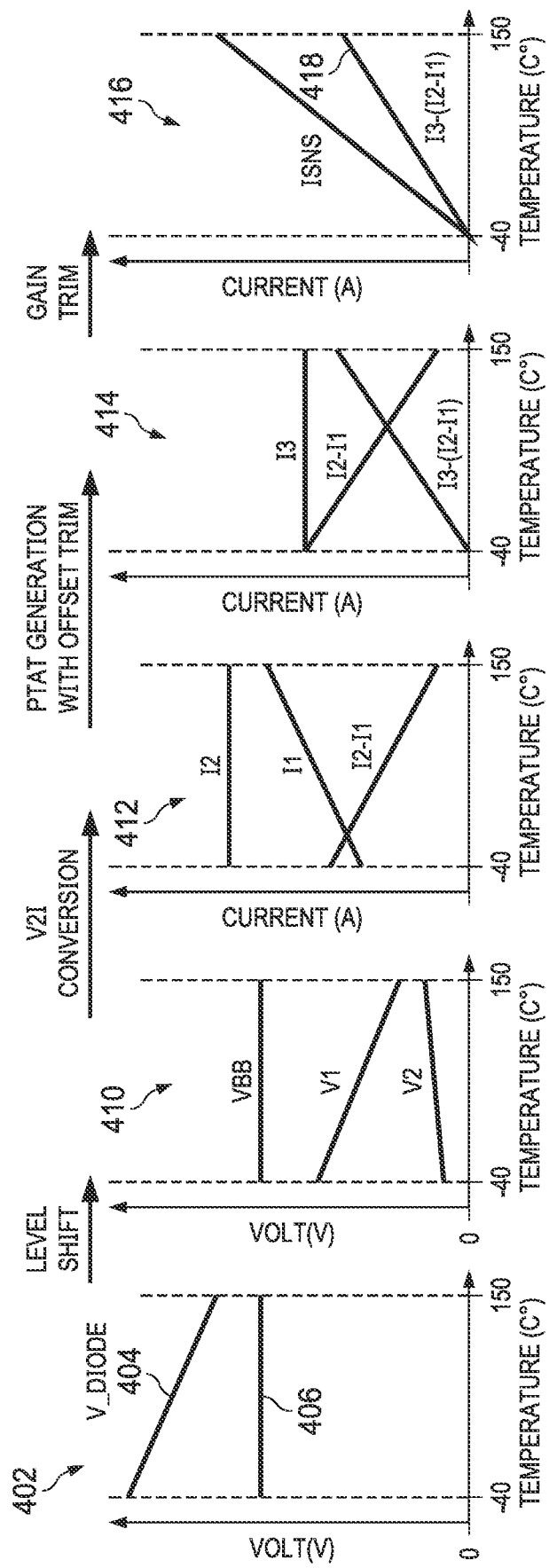
FIG. 4 are plots of signals showing the effects of processing by various stages of the temperature sensor circuit of FIG. 3.

FIG. 4 includes a sequence of plots to demonstrate operation of the sensor circuit 300 in which voltage and current signals are demonstrated as a function of temperature at various stages of the circuit 300. In a plot 402 of voltage as a function of temperature, a diode voltage 404 is demonstrated as decreasing linearly with respect to temperature. A battery voltage 406 remains constant over temperature.

In response to the level shifter circuit 302 shifting the level of the input voltage from the diode 304, level-shifted voltage signals are provided, as demonstrated in the plot 410. As shown in plot 410, the level shifter provides voltages V1 and V2 at a level below the battery voltage VBB, which remains constant over temperature. As disclosed with respect to FIG. 3, voltages V1 and V2 are provided as input signals to the voltage-to-current conversion circuitry 316. The voltage-to-current converter circuitry 316 is configured to convert the voltages V1 and V2 to current signals shown in plot 412. As shown in plot 412, corresponding current signals I1 and I2 are provided and, through the current mirror arrangement demonstrated n FIG. 3, produce a difference current (I2−I1), which is applied to the PTAT generator circuit 340 along with an offset trim current (e.g., from offset trim circuit 344) to produce signals demonstrated in plot 414. For example, the PTAT generator circuit 340 is configured to combine the offset current I3 and the difference current I2−I1 to produce the offset-corrected current I3−(I2−I1), such as shown in plot 414. The offset-corrected current is supplied as an input to the gain trim circuitry 346 to produce signals demonstrated in plot 416. For example, the gain circuitry 346 applies a gain factor (e.g., based on a ratio of resistors R4 and R5) to the offset-corrected current 418 to produce the sensor signal ISNS, which has been both offset and gain corrected. As disclosed herein, the offset and gain trim are applied to compensate for temperature coefficient mismatch between sensing elements (e.g., diodes) used in separate temperature sensing circuits. For example, the offset trim is configured to provide level (e.g., DC level) compensation and gain trim is configured to provide slope compensation of the currents.

Figure 5:
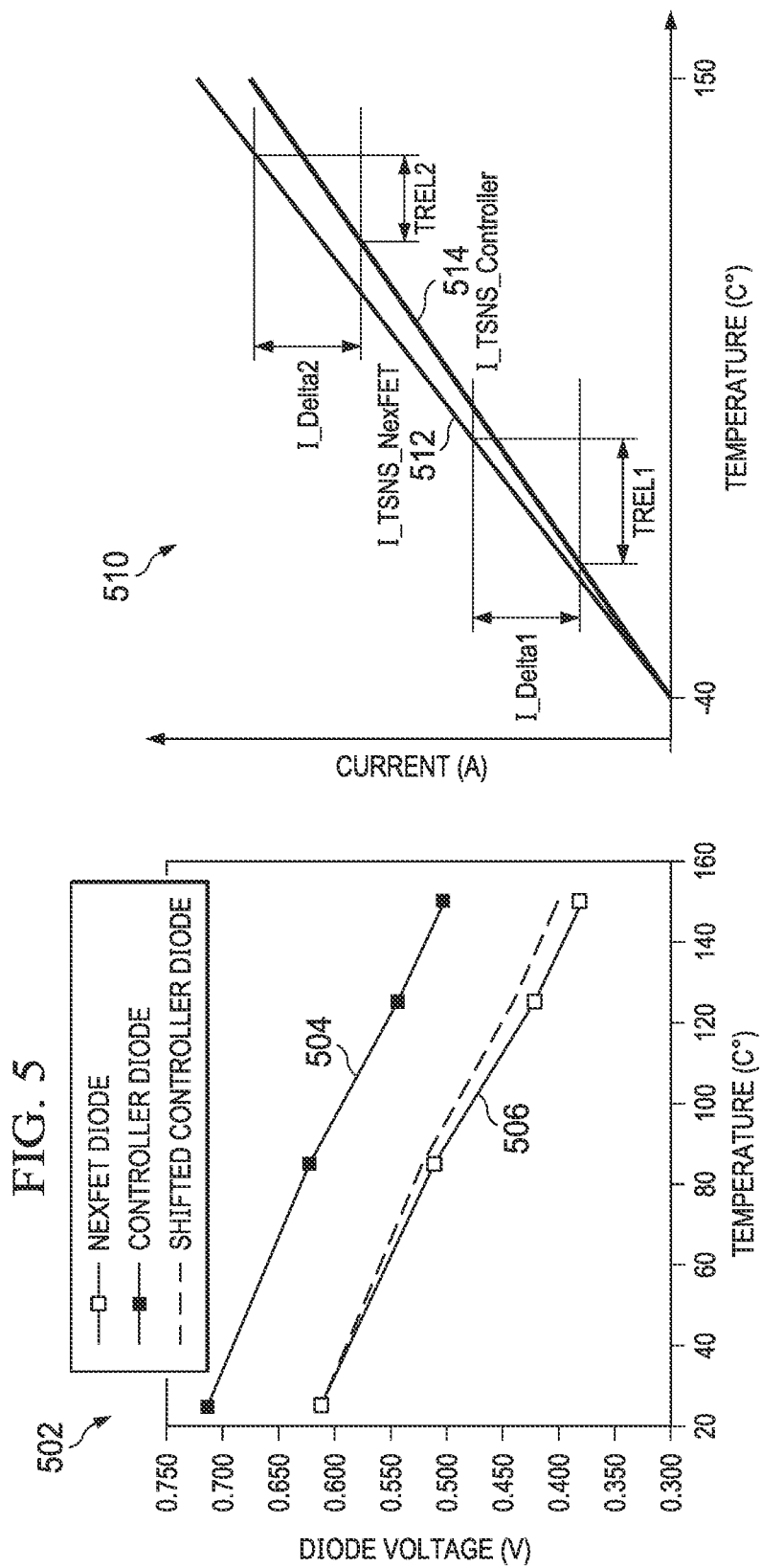
FIG. 5 are plots of voltage and current as a function of temperature.

As a further example, FIG. 5 demonstrates an example of some effects of diode mismatch that are to be compensated by trim circuitry (e.g., offset trim and gain trim circuitry) disclosed herein. In FIG. 5, plot 502 demonstrates diode voltage as a function of temperature. In particular, a voltage curve 504 demonstrates diode voltage as a function of temperature for a diode implemented on an IC die that includes a power FET device (e.g., 101 or 204). Another plot 506 demonstrates a diode implemented on a controller IC die (e.g., 112 or 214). The differences between diode voltages over temperature shown at 502 and 504 may result from semiconductor fabrication processing variation in the technologies used to produce respective diode structures (or other temperature sensing elements) having different temperature coefficients. As shown in the plot 510, resulting currents without applying gain or trim offsets are shown at 512 and 514. The current 512, for example corresponds to the current provided based on the diode voltage 504 and the current 514 corresponds to the diode voltage 506. As shown in the plot of 510, without compensating for the difference in temperature coefficients demonstrated in plot 502, the threshold voltages demonstrated at TREL1 and TREL2 will vary over ambient temperature of the IC die on which the sensors are implemented for a same difference in current (e.g., for I_delta1=I_delta2). This difference is visualized as a difference in slope between plots 512 and 514. As disclosed herein, trim circuitry is configured to apply both offset and gain trim to compensate for the difference in temperature coefficients between the diodes such that an accurate relative thermal shutdown can be implemented with a consistent threshold across the ambient temperature range. For example, gain trim can adjust the slope of the current over temperature and offset trim can adjust the level of current.

Figure 6:
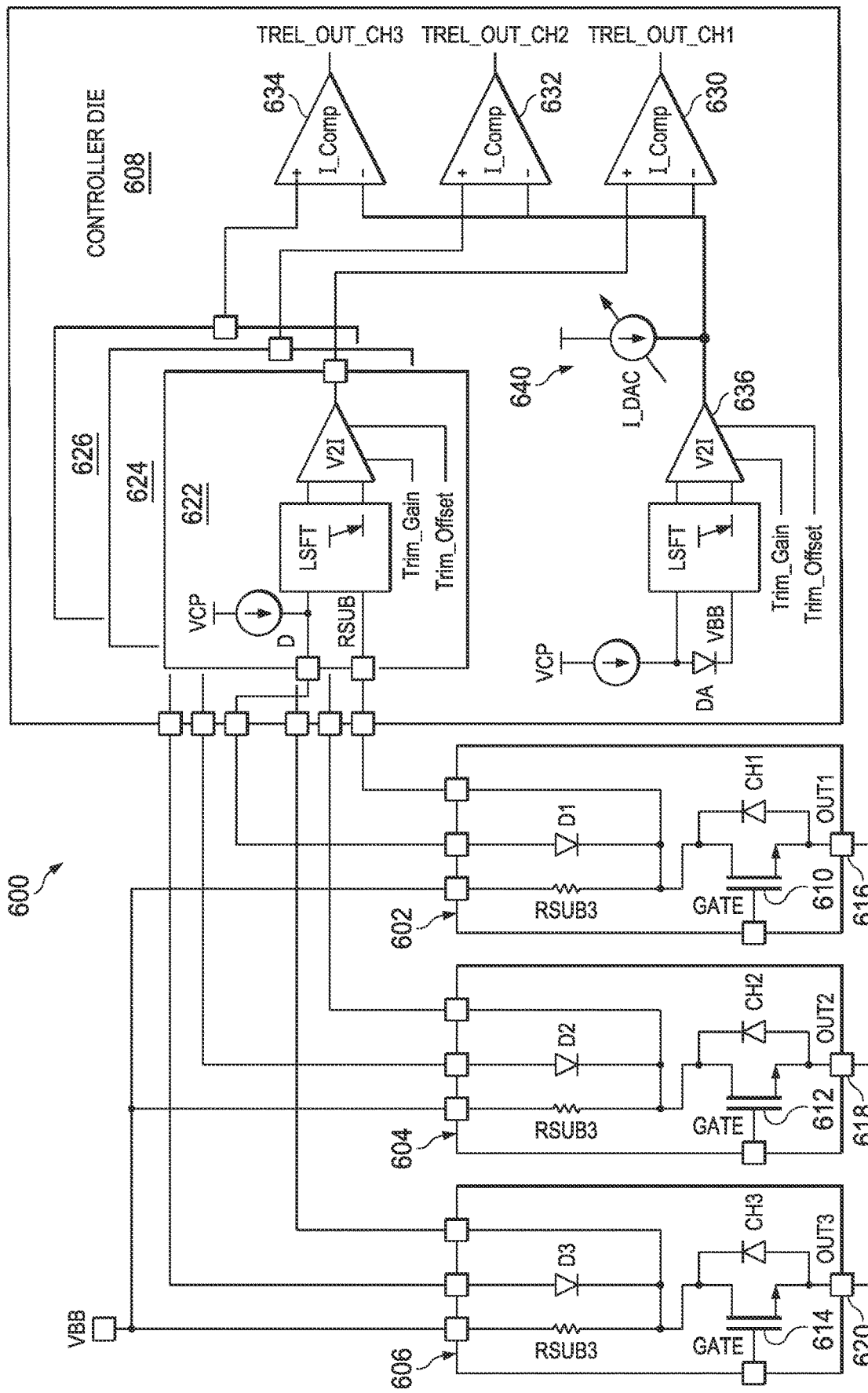
FIG. 6 depicts an example of a thermal sensing and shutdown system that includes a plurality of power switch devices and associated thermal sensors.

FIG. 6 illustrates an example of a multi-channel thermal shutdown system 600.

The system 600 can be implemented in a multi-die module that includes a plurality of IC dies 602, 604, 606 and 608. As a multi-channel implementation, there can be any number of two or more IC dies 602, 604 and 606 that each includes a respective power switch device 610, 612, and 614. Each power switch device 610, 612, and 614 can be a power FET that is controlled (e.g., by circuitry on controller die 608) to supply output power to load (not shown) via a corresponding output 616, 618 and 620. Three such power switch IC dies are demonstrated in the example of FIG. 6. However, a greater or lesser number of power switch IC dies may be used in other examples. A supply voltage VBB can supply a DC voltage to a corresponding input of each of the IC die circuits 602, 604 and 606, as shown.

Each of the IC die circuits 602, 604, 606 also includes a respective temperature sensing element, demonstrated as a respective thermal diode D1, D2 and D3. Corresponding inputs of the controller die includes are coupled to respective terminals across each diode to supply the diode voltages to respective inputs of temperature sensor circuits 622, 624 and 626. As disclosed herein, each respective diode voltage varies as a function of temperature of the respective IC die 602, 604 and 606 and thus represents temperature of the respective power switch device 610, 612 and 614. Each temperature sensor 622, 624 and 626 can be implemented according to the example sensors disclosed herein (e.g., sensors 106, 216 or 300).

By way example, each temperature sensor 622, 624 and 626 is configured to convert its sensed diode voltage to a corresponding current signal that represents the sensed temperature of the respective FET 610, 612 and 614. Each temperature sensor 622, 624 and 626 may include a level shifter a voltage-to-current converter to convert the diode voltage to the corresponding sensed current signal. As disclosed herein, each temperature sensor 622, 624 and 626 further configured to compensate for a temperature coefficient mismatch according to a trim gain and/or trim offset applied to the respective temperature sensor. Each temperature sensor 622, 624 and 626 provides a respective current signal, which has been adjusted based on the trim gain and/or trim offset, to an input of a respective current comparator 630, 632 and 634.

The controller die 608 includes a temperature sensing element, shown as a diode DA, configured to provide a diode voltage to a second temperature sensor 636 (e.g., corresponding to sensor 106, 218 or 300). The diode voltage represents an ambient temperature associated with the controller die. The second temperature sensor 636 is configured to convert the diode voltage to a corresponding current signal that is supplied to a second input of each respective current comparator 630, 632 and 634. The temperature sensor 636 is further configured to compensate for a temperature coefficient mismatch according to a trim gain and/or trim offset that is applied.

A threshold circuit 640 is configured to apply a threshold (e.g., a current signal) to the current provided by the sensor 636. For example, threshold circuit 640 is configured (e.g., as a current DAC) to provide a multi-channel current threshold that is set for each current comparator 630, 632 and 634 according to the specifications of each respective power switch device 610, 612 and 614. In this way, each comparator is configured to provide a relative temperature output signal for each respective channel (TREL_OUT_CH1, TREL_OUT_CH2 TREL_OUT_CH3) that can be utilized to control thermal shutdown of the channel's respective power switch device 610, 612 and 614. For example, if the temperature of IC die 604, as indicated by the current sensor signal from sensor 624, exceeds the temperature sensed by diode DA for the IC die 608 by an amount greater than its respective threshold, the comparator 632 provides a high output to trigger shutdown of the power switch device 612. If the temperature of the IC die 604 does not exceed the temperature of the ICI die 608 by the threshold, the comparator 632 provides a low output, such that the power switch device 604 may remain turned on. The system 600 operates similarly to monitor temperature and control thermal shutdown for each respective FET channel. This current-mode structure utilized in temperature sensor circuits 622, 624, 626 and 636 helps extend temperature sensing to multi-channel devices, as shown in the example of FIG. 6. For example, by adding a front-end voltage-to-current conversion circuit (as in sensor circuits 622, 624, 626 and 300) for each additional power FET device, the relative thermal shutdown system can be expanded without much of an increase in die area.

In view of the foregoing structural and functional features, the example embodiments disclosed herein, provide clamp circuitry to protect power switch devices across a variety of transient electrical disturbances and operating conditions. Example embodiments implement thermal handling to operate power switch devices within SOA limits of power switch. As described herein, the circuits and devices (see, e.g., FIGS. 1-3 and 6) provide a low-cost solution that can reduce the area for temperature sensor circuitry utilized to limit the energy accumulation, such as during high in-rush condition. In contrast, existing approaches used voltage differential amplifier to generate PTAT current, which tend to use a greater on-chip area. For example, the current current-mode structure disclosed herein may be implemented with a fewer number of devices compared to the voltage-mode structure used in existing approaches. Additionally, because there are fewer devices connected in series from the supply voltage to ground, the circuit has more operation range under low supply voltage conditions as well as affords improved bandwidth for sensing temperature of power switch devices during fast high in-rush current conditions.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. In this description, the term "based on" means based at least in part on. As used herein, the term "includes" means includes but not limited to, the term "including" means including but not limited to. Additionally, where the disclosure or claims recite "a," "an," "a first," or "another" element, or the equivalent thereof, it should be interpreted to include one or more than one such element, neither requiring nor excluding two or more such elements.

What is claimed is:

1. A circuit comprising:
   a level shifter including an input adapted to be coupled to a diode and including a level shifter output;
   a voltage-to-current converter including an input coupled to the level shifter output and a sensor current output;
   an offset trim circuit including an offset current output;
   a proportional to absolute temperature (PTAT) current generator including a first PTAT input coupled to the sensor current output and a second PTAT input coupled to the offset current output, the PTAT current generator also including a PTAT output; and
   a gain trim circuit including an input coupled to the PTAT output and including a sensor output.

2. The circuit of claim 1, further comprising the diode, the diode configured to provide a diode voltage to the input of the level shifter that varies based on a temperature of a substrate of the diode, the level shifter configured to provide a level shifted voltage at the level shifter output based on shifting the diode voltage.

3. The circuit of claim 2, wherein the voltage-to-current converter further comprises an amplifier having a first input coupled to the level shifted voltage and a second input coupled to a battery voltage through a resistance, the amplifier having an output coupled to a control input of a switch device, the switch device being connected in series with the resistance and configured to provide corresponding current at the sensor current output based on the diode voltage, the battery voltage and the resistance.

4. The circuit of claim 2, wherein the level shifter is configured to provide a level shifted voltage as a differential voltage, corresponding to first and second voltages, at respective level shifter outputs based on the diode voltage, a charge pump voltage and a battery voltage,
wherein the voltage-to-current converter further comprises:
a first voltage-to-current conversion circuit configured to convert the first voltage to a first current signal based on the battery voltage and a first resistor; and
a second voltage-to-current conversion circuit configured to convert the second voltage to a second current signal based on the battery voltage and a second resistor.

5. The circuit of claim 4, wherein the offset trim circuit is configured to provide an offset current based on an offset voltage, and
wherein the PTAT current generator is configured to generate a PTAT current at the PTAT output based on the first current signal, the second current signal and the offset current.

6. The circuit of claim 2, wherein the diode is a first diode, the level shifter is a first level shifter, the voltage-to-current converter is a first voltage-to-current converter, the offset trim circuit is a first offset trim circuit, the PTAT current generator is a first PTAT current generator, and the gain trim circuit is a first gain trim circuit, further comprising:
a first temperature sensor that includes the first level shifter, the first voltage-to-current converter, the first offset trim circuit, the first PTAT current generator, and the first gain trim circuit, the first temperature sensor configured to convert a first diode voltage from the first diode to a first current signal; and
a second circuit comprising:
a second diode configured to provide a second diode voltage that varies based on a temperature of a substrate of the second diode;
a second level shifter including an input coupled to the second diode and including a second level shifter output;
a second voltage-to-current converter including an input coupled to the second level shifter output and a second current output;
a second offset trim circuit including a second offset current output;
a second PTAT current generator including a second PTAT input coupled to the second current output and a second PTAT input coupled to the offset current output, the second PTAT current generator also including a second PTAT output configured to provide a respective PTAT current; and
a second gain trim circuit including an input coupled to the second PTAT output and including a second sensor output.

7. The circuit of claim 6, wherein the substrate of the first diode comprises a first die that includes the first diode and a power switch device and wherein the substrate of the second diode comprises a second die, further comprising:
a temperature comparator coupled to the first and second sensor outputs, the temperature comparator configured to compare a difference between current signals at the first and second sensor outputs relative to a threshold to control shutdown of the power switch device.

8. The circuit of claim 7, wherein the first die and the second die reside in a common packaging of a multi-die module.

9. A sensor circuit having a sensor input adapted to be coupled to a temperature sensor, the sensor circuit comprising:
a level shifter including an input coupled to the sensor input and including a level shifter output;
a voltage-to-current (V2I) converter including a V2I input coupled to the level shifter output and including a sensor current output, the V2I converter operable to generate a first current responsive to a first sensor voltage and to generate a second current responsive to a second sensor voltage;
an offset trim circuit including an offset current output, the offset trim circuit operable to generate an offset current;
a proportional to absolute temperature (PTAT) current generator including a first PTAT input coupled to the sensor current output and a second PTAT input coupled to the offset current output, the PTAT current generator also including a PTAT output, the PTAT current generator operable to generate a third current based on the first current, the second current and the offset current; and
a gain trim circuit including an input coupled to the PTAT output and including a sensor output.

10. The sensor circuit of claim 9, wherein the gain trim circuit is operable to apply a gain to the third current.

11. The sensor circuit of claim 9, wherein the level shifter includes a first transistor operable to generate the first sensor voltage and includes a second transistor operable to generate the second sensor voltage.

12. The sensor circuit of claim 11, wherein the temperature ensor includes a thermal diode having a cathode and an anode.

13. The sensor circuit of claim 12, wherein the anode is coupled to a control terminal of the first transistor and the cathode is coupled to a control terminal of the second transistor.

* * * * *